United States Patent [19]
Rab

[11] Patent Number: 5,337,598
[45] Date of Patent: Aug. 16, 1994

[54] LEAK TEST PORT PLUG

[75] Inventor: Dennis Rab, Hillpoint, Wis.

[73] Assignee: Bimba Manufacturing Company, Monee, Ill.

[21] Appl. No.: 822,622

[22] Filed: Jan. 17, 1992

[51] Int. Cl.⁵ .................................... G01M 3/08
[52] U.S. Cl. .............................. 73/49.8; 73/49.6; 138/90; 220/237
[58] Field of Search .............. 73/49.8, 49.5, 49.6; 138/90; 220/233, 234, 235, 236, 237, DIG. 19

[56] References Cited

U.S. PATENT DOCUMENTS

| | | | |
|---|---|---|---|
| 2,062,527 | 12/1936 | Postlewaite | 73/49.5 |
| 2,581,537 | 1/1952 | Maisch | 73/49.8 X |
| 2,708,588 | 5/1955 | Prah | 138/90 X |
| 2,978,138 | 4/1961 | Moeller | 220/235 |
| 3,857,414 | 12/1974 | Richardson et al. | 138/90 |
| 4,393,674 | 7/1983 | Rasmussen | 73/49.8 X |

FOREIGN PATENT DOCUMENTS

| | | | |
|---|---|---|---|
| 589396 | 12/1959 | Canada | 220/237 |
| 3230146 | 2/1984 | Fed. Rep. of Germany | 73/49.5 |
| 194381 | 3/1967 | U.S.S.R. | 73/49.8 |
| 194382 | 5/1967 | U.S.S.R. | 73/49.8 |
| 977968 | 11/1982 | U.S.S.R. | 73/49.5 |
| 1422041 | 9/1988 | U.S.S.R. | 73/49.8 |

OTHER PUBLICATIONS

Fas Test, *Sealing Threads Pipes and Ports*, trade brochure with printer's mark "FT-0188".

*Primary Examiner*—Hezron E. Williams
*Assistant Examiner*—Joseph W. Roskos
*Attorney, Agent, or Firm*—Lockwood, Alex, FitzGibbon & Cummings

[57] ABSTRACT

A leak test port plug device is disclosed which includes a resilient plug having a first portion which is substantially cylindrical and a second portion which is generally conical and formed in integral one-piece relationship to the first portion. When the first portion is inserted into a port of a component to be tested and the plug is compressed, the first portion radially expands in the port and the second conical portion moves into the end of the port to effectively seal the port against fluid leakage.

40 Claims, 2 Drawing Sheets

LEAK TEST PORT PLUG

FIELD OF THE INVENTION

The present invention relates generally to a test device for testing fluid pressure system components, and more particularly, to a fluid operated leak test port plug.

BACKGROUND OF THE INVENTION

In machines, devices and systems which operate under vacuum or fluid pressure, such as pneumatic cylinders and the like, it is important that performance is optimal and that fluid leakage from the components be minimized if not eliminated altogether. In an effort to ensure optimum performance, the components of these systems frequently are subjected to rigorous and exacting testing procedures to determine if leaks exist in the system components by measuring their ability to maintain their desired pressure or vacuum over a period of time.

In the past it was common for manufacturers of such systems and their components to perform pressure or vacuum tests on the components during production and prior to assembly of the components into the system by utilizing fluid operated test devices for identifying components, such as pneumatic cylinders, that do not measure up to the necessary leak integrity requirements. These prior art test devices generally have included a cylinder having a cylindrical resilient sleeve adjacent an end of the cylinder. The sleeve was formed of an elastomer, such as neoprene or urethane. A piston in the cylinder and a rod on the piston extends through an end of the cylinder and the resilient sleeve is mounted on the end of the rod. The rod included an abutment on its end for trapping the resilient sleeve between one end of the cylinder and the abutment to compress it when fluid pressure was introduced into the cylinder of the test device. This caused the cylindrical sleeve to expand into the port of the component being tested. Once the port was sealed, a pressurized fluid was then introduced through the rod to pressurize the component being tested. Various pressure indicating devices attached to the fluid supply could then be monitored to insure that the component pressure over time was within established standards or parameters.

Because even the slightest leak through the port of the component being tested can significantly alter and detract from the test results, it is imperative that the sleeve connection in the port of the component in which it is inserted is leak tight. One problem associated with the prior art cylindrical sleeve test devices, particularly when employed to test components with internally threaded test ports, was the short life span of the resilient sleeve if sufficient compression was applied to the sleeve to insure a fluid tight seal. In order to achieve a seal in the test devices utilizing a cylindrical sleeve, the cylindrical sleeve must radially expand during its axial compression so as to fully and deeply enter the roots of the threads of the port. As a result if these test devices are to be leak proof, the resilient sleeve frequently was damaged by the threads, thus significantly decreasing the number of times a test device could be used before its sleeve became ineffective. On the other-hand if the degree of compression is reduced in the interest of longevity of the resilient sleeve, undesirable leaks occurred through the port threads which reduced the reliability of the prior test devices.

In an effort to remedy this problem, some prior art test devices have also utilized a second and separate annular resilient seal to bear against the end face around the port of the component being tested. This seal sealed the face of the component in conjunction with the radially expanding cylindrical resilient sleeve. Such second seal permitted the prior test devices to be operated at somewhat lower pressures so that the cylindrical sleeve need only be compressed and expanded to a lesser degree and depth into the roots of the port threads and, thereby, permitted increased longevity of the sleeve. However, the provision of this second separate seal results in increased costs, additional assembly time and increased inventory requirements for the separate parts. Additionally, the effectiveness of these two part seals is substantially reduced where the face of the cylinder containing the port is rounded or has a contour other than substantially flat because the second seal cannot fully seat against such contour.

SUMMARY OF THE INVENTION

The test device and leak test port plug of the present invention overcomes the aforementioned disadvantages of the prior art. The test device and leak test port plug constructed in accordance with the present invention is of simple one-piece construction and, thereby, facilitates assembly and use and reduces the need for inventory of disparate parts and costs of manufacture and assembly. Moreover, it effectively and completely seals the port of the component being tested against leakage without a reduction in the longevity of the plug, and it may be used with equal facility for the testing of components which present flat as well as contoured ends.

In one principal aspect of the present invention, a fluid operated port plug for sealingly closing a port against leakage includes a cylinder casing having opposite ends, a chamber therein between the ends and a piston in the chamber. A piston rod on the piston has an end extending through at least one end of the cylinder casing. A resilient member on the end of the piston rod includes a first resilient portion and a second resilient portion between the cylinder casing and the first resilient portion and adjacent to the first portion, and the second resilient portion extends outwardly from the first resilient portion. Means is provided for introducing a pressurized fluid to the chamber to move the piston and piston rod and compress the resilient member between the end of the piston rod and one end of the cylinder casing to cause the first resilient portion to expand in the port and the second resilient portion to move into the port, whereby the port is sealed against leakage.

In another principal aspect of the present invention, the second resilient portion of the resilient member extends from the first resilient portion toward the one end of the cylinder casing.

In still another principal aspect of the present invention, the second resilient portion is substantially conical and extends outwardly from the first resilient portion.

In still another principal aspect of the present invention, the first and second resilient portions are formed in integral one-piece relationship to each other.

In still another principal aspect of the present invention, the first resilient portion is substantially cylindrical and the second resilient portion is substantially conical.

In still another principal aspect of the present invention, the piston rod has a passage which opens to the end of the piston rod to discharge fluid therefrom.

In still another principal aspect of the present invention, the resilient member substantially surrounds the end of the piston rod from which the fluid is discharged.

In still another principal aspect of the present invention, the plug includes at least two ports, one port communicating with the chamber to introduce and exhaust fluid therefrom to move the piston and piston rod, and the second port communicating with the passage in the piston rod to introduce fluid thereto.

In still another principal aspect of the present invention, the cylinder casing has a valve therein for introducing fluid and exhausting fluid from the chamber to move the piston and piston rod.

In still another principal aspect of the present invention, the valve includes a passage in the cylinder casing and a moveable spool valve therein which may be manually manipulated by the finger of an operator.

In still another principal aspect of the present invention, a method of sealing a port comprises the steps of inserting a first resilient portion of an elongate resilient member into the port, compressing the elongate resilient member to cause the first resilient portion to radially expand in the port, and moving a second resilient portion of the elongate resilient member into an end of the port as a result of the compression of the elongate resilient member to seal the port against leakage.

In still another principal aspect of the present invention, in the foregoing method the radial expansion of the first resilient portion also seals the port against leakage.

In still another principal aspect of the present invention, in the foregoing method the first and second resilient portions are formed in integral one-piece relationship with each other.

In still another principal aspect of the present invention, the foregoing method also includes introducing a pressurized fluid through the elongate resilient member and through the port following compression of the elongate resilient member and sealing of the port.

In still another principal aspect of the present invention, the foregoing method includes compression of the elongate resilient member by a fluid actuated piston.

These and other objects, features and advantages of the present invention will become apparent upon consideration of the following detailed description of a preferred embodiment of the present invention.

BRIEF DESCRIPTION OF THE DRAWINGS

For a more complete understanding of the present invention, reference will be made to the preferred embodiment illustrated in greater detail in the accompanying drawings and described below by way of example of the invention. In the drawings.

DETAILED DESCRIPTION OF THE PREFERRED EMBODIMENT

Figure 1:
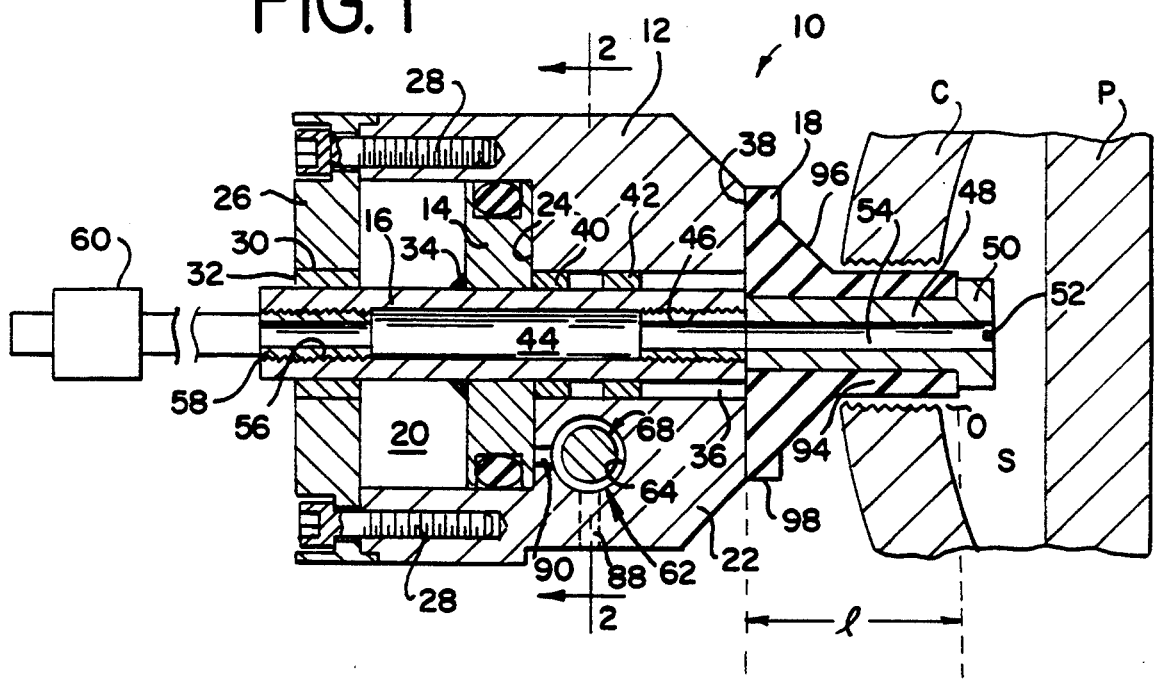
FIG. 1 is a cross-sectioned side elevation view of a fluid leak test port plug device constructed in accordance with the principles of invention, and of a partial broken view of a component to be tested thereby as the device is being placed therein in preparation for testing.

A preferred embodiment of leak test port plug device 10 is shown in the drawings for effecting a sealing connection to a fluid port of a fluid powered component, such as a pneumatic cylinder C, which is to be tested. The test plug device 10 generally includes a cylinder casing 12, a piston 14 therein, an elongate tubular piston rod 16 extending through the cylinder casing 12 and the piston 14, and a resilient plug 18 on one end of the rod 16.

Figure 3:
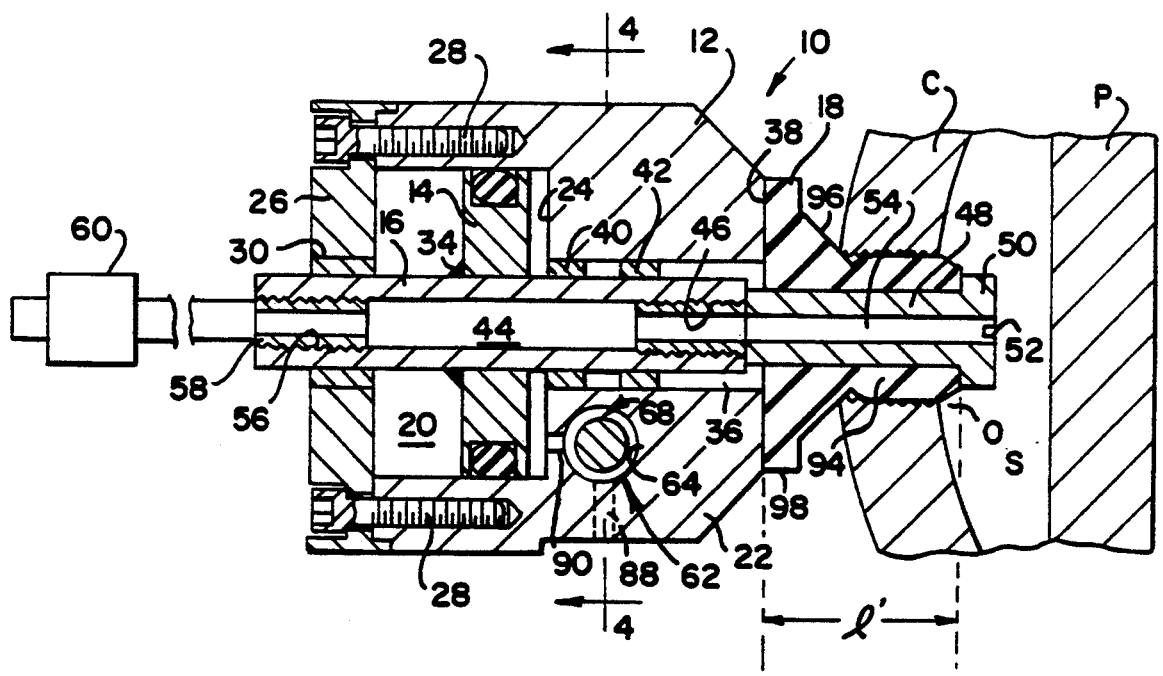
FIG. 3 is a cross-sectioned side elevation view of the test device substantially as shown in FIG. 1, but in its actuated port sealing condition during testing of the component.

As best seen in FIGS. 1 and 3, the preferred cylinder casing 12 includes a chamber 20 adjacent one end thereof in which the piston 14 is positioned for reciprocal movement back and forth therein. One end of the chamber 20 is sealed by an end block 22 having an inner face 24 facing the chamber. The other end of the chamber 20 is closed by a suitable end plate 26 which is attached to the cylinder casing 12 by suitable means, such as threaded bolts 28. The end plate 26 also includes an opening 30 in which a suitable bearing seal 32 is positioned, as best seen in FIGS. 1 and 3.

The left end, as viewed in the drawings, of the elongate tubular piston rod 16 passes through the bearing seal 32 and reciprocates back and forth in that seal. The tubular piston rod 16 is fixed intermediate its length to the piston, as by welds 34 as best seen in FIGS. 1 and 3. The right end of the piston rod 16, also as viewed in FIGS. 1 and 3, extends beyond the piston 14 and into a longitudinal passage 36 through the end block 22. The passage 36 extends from the inner face 24 of the end block 22 through its opposite outer face 38. The longitudinal passage 36 is preferably somewhat larger in diameter than the outer diameter of the tubular piston rod 16, and one or more annular bearing seals 40 and 42 are preferably positioned in the longitudinal passage 36 and about the circumference of the tubular piston rod 16 to facilitate and guide the longitudinal movement of the rod 16 in the passage 36.

A passage 44 also extends through the tubular piston rod 16 longitudinally and axially from one of its ends to the other. The right end of the passage 44, as viewed in FIGS. 1 and 3, is preferably internally threaded at 46 to receive a threaded bolt 48 therein. The bolt 48 includes an enlarged head 50 which is preferably slotted at 52 to facilitate the threading of the bolt into the threaded end 46 of the passage 44 of the tubular piston rod 16. The bolt 48 also includes a passage 54 which extends axially through the bolt and its head 50 to discharge test fluid into the component to be tested.

The other end of the passage 44 in the tubular piston rod 16 is also preferably internally threaded at 56 to receive a threaded coupling 58, again as best seen in FIGS. 1 and 3. The coupling 58 permits the connection of a suitable pressure fluid introduction assembly which includes test meters and the like, such as test assembly 60, also as best seen in FIGS. 1 and 3.

The cylinder casing 12 also includes a valve assembly generally 62 for admitting fluid to and exhausting fluid from the chamber 20. As best viewed in FIGS. 2 and 4, the valve assembly 62 preferably comprises an elongate passage drilled chordally through the end block 22 in non-communicating relationship with the longitudinally extending passage 36. One end of the chordal passage 64 is preferably reduced in diameter to act as a stop 66.

Figure 2:
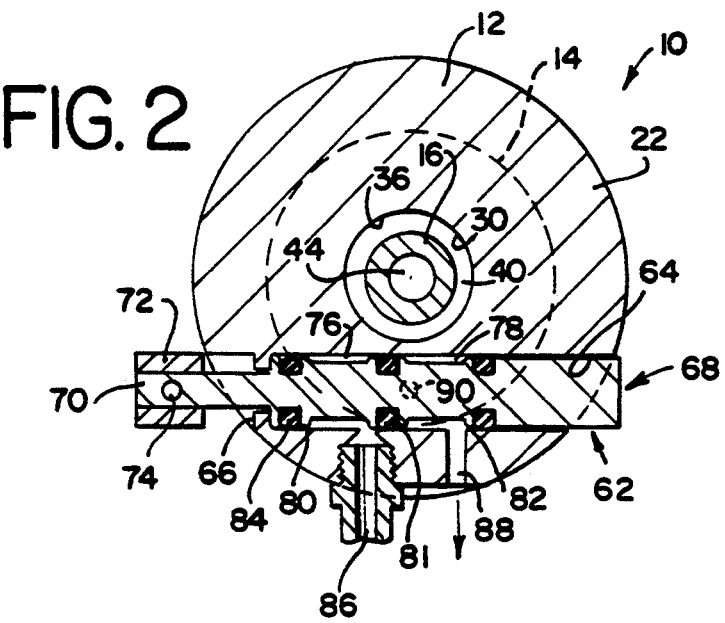
FIG. 2 is a cross-sectioned end elevation view of the device, as viewed substantially along line 2—2 of FIG. 1, and showing the valve for controlling the flow of actuation fluid to the test device.
Figure 4:
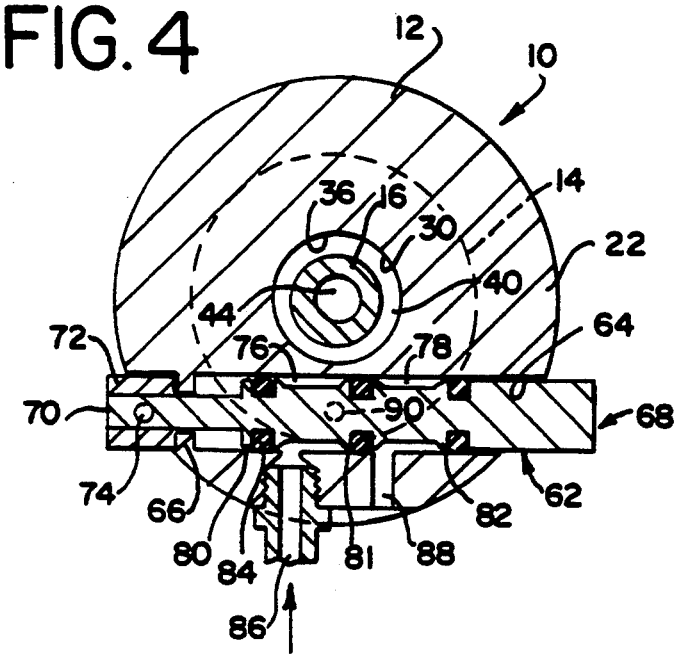
FIG. 4 is a cross-sectioned end elevation view of the test device, as viewed substantially along line 3—3 of FIG. 3.

A cylindrical spool valve 68 which is longer than the chordal passage 64 is positioned in the passage. The spool valve 68 has a reduced diameter stem 70, as best seen in FIGS. 2 and 4. The stem 70 is inserted through the reduced diameter annular stop 66 so as to extend beyond the stop to the left as viewed in the drawings. An annular spool valve stop 72 is then affixed to the stem 70 by a suitable fastener, such as a rivet 74 or the like, after the stem has been inserted through the reduced diameter stop 66 from the right as viewed in the drawings. Thus, the stop 72 prevents the spool valve from being removed from the right of the passage 64 when it moves into engagement with the stop 66 as viewed in FIG. 4.

The spool valve 68 also includes a pair of longitudinally spaced annular reduced diameter portions 76 and 78, also as best viewed in FIGS. 2 and 4. These reduced diameter portions 76 and 78 are defined by enlarged annular bearing and sealing surfaces 80, 81 and 82 spaced along the length of the spool valve. Each of the annular bearing surfaces 80-82 also preferably includes a suitable seal, such as an O-ring 84, to prevent communication of fluid between the reduced diameter portions 76 and 78 and from the ends of the spool valve.

The end block 22 of the cylinder casing 12 also includes a port 86 which communicates a source of high pressure fluid as shown by the arrow in FIG. 4, to the chordal passage 64, a port 88 which exhausts pressurized fluid from the chordal passage 64 as shown by the arrow in FIG. 2, and a port 90 which communicates chamber 20 with the chordal passage 64. These ports together with the valve 68 permit the controlled introduction and exhaust of pressurized fluid to and from the chamber 20 to operate the piston 14 and its piston rod 16.

An important feature of the present invention is the provision of the flexible elastomeric preferably one-piece plug 18 which extends between the head 50 of bolt 48 and the outer face 38 of end block 22, as best seen in FIGS. 1 and 3. The plug 18 is formed of a suitable flexible elastomeric material, such as neoprene, urethane or other flexible elastomer. The plug 18 comprises a generally cylindrical portion 94 at its end adjacent the bolt head 50, and a generally angled or conical portion 96 extending outwardly from and adjacent the cylindrical portion and toward the outer face 38 of the end block 22. The plug 18 also preferably includes an enlarged flanged portion 98 which bears directly against the outer face 38 of the end block 22.

Although it is believed that, from the foregoing description of the preferred embodiment of test device of the present invention, its operation will be evident to those skilled in the art, a brief description of its operation follows.

For purposes of this description, it will be assumed that the component to be tested is a pneumatic cylinder C having a piston P therein which defines a space S between the end wall of the cylinder C and the piston P, and that the test device 10 is to be inserted into one of the conventional fluid ports or openings 0 in that end wall. Also as shown in the drawing the end wall of the cylinder C containing the port is contoured rather than flat to exhibit the effectiveness of the plug in its sealing function when used in conjunction with such complex surfaces.

As shown in FIG. 1, the cylindrical portion 94 of the plug 18 is first inserted into the port or opening 0. In this condition the plug 18 is relaxed with the piston 14 of the test device 10 positioned adjacent the inner face 24 of the end block 22, as shown in FIG. 1. In this condition the spool valve 68 has been moved to the far left, as shown in FIG. 2. In this position its annular bearing surface 80 will bear against the inside of stop 66 to restrict further movement of the spool valve to the left. Thus, port 90 from the chamber 20 will be aligned with the reduced diameter portion 78 of the spool valve, and with the exhaust port 88 to vent the chamber 20 as shown by the arrow in FIG. 2.

To commence a test of the cylinder C, it is first necessary to thoroughly seal the port or opening 0. To do this the spool valve 68 is moved to the right, as viewed in FIG. 4, until its annular stop 72 engages the stop 66. In this position, high pressure fluid, for example air, will be communicated from port 86 as shown by the arrow in FIG. 4, pass through the reduced diameter portion 76, the port 90 and into the chamber 20 and to the right side of the piston 14. This will force the piston 14 to the left, as well as its piston rod 16. As the piston rod moves to the left, its bolt head 50 will move toward the outer face 38 of the cylinder casing 12 to compress the resilient plug 18 and cause its cylindrical portion 94 to swell and radially expand, as shown in FIG. 3.

As the cylindrical portion 94 swells, it will engage the threaded inner wall of the cylinder opening 0 to lock the device 10 into the opening and commence sealing of the opening. Compression of the plug 18 will also shorten the overall length of the plug from its relaxed length l, as shown in FIG. 1, to its compressed shorter length l' as shown in FIG. 3. When this occurs, the leading edge of the conical portion 96 adjacent the cylindrical portion 94 will be drawn into the outer end of the opening 0 to complete and insure a firm leak-proof seal at the opening, as shown in FIG. 3.

Once the space S in the cylinder C is thoroughly sealed off, the pressure test fluid may be admitted through the test assembly 60 and coupling 58. This fluid passes through passage 44 in the tubular piston rod, passage 54 in the bolt 48 and into the space S. The ability of the cylinder C to maintain this fluid pressure over time may now be measured by appropriate gages or the like (not shown) on the assembly 60.

When it is desired to remove the test device 10 from the cylinder C for use in testing another component, all that need be done is to move the spool valve 68 from its position as shown in FIG. 4, to the left as shown in FIG. 2 until its annular bearing surface 80 again comes to rest against the stop 66. In this condition the chamber 20 is vented through port 90, around the reduced diameter portion 78 of the spool valve 68 and through the exhaust port 88. When the chamber 20 is vented, the natural resiliency of the plug 18 will cause it to return to its original shape and thereby extend from its length l', as shown in FIG. 3, to the length l as shown in FIG. 1. This expansion will draw the piston 14 back toward the inner face 24 of the end block 22 in readiness for the next test, and will cause the cylindrical portion 94 of the resilient plug to contract to its original diameter so the test device can be readily removed from the port 0.

The test device 10 of the present invention is preferably scaled so as to be easily hand held by the user, and the spool valve need only be simply manually operated by the finger of the user between its positions as shown in FIGS. 2 and 4. However, it will be appreciated that the test device may be larger or smaller as desired and may be operated mechanically rather than manually.

From the foregoing it will be appreciated that the sealing plug of the present invention overcomes most if not all of the disadvantages of the prior art constructions. It is of simple one-piece construction and, thereby, facilitates assembly and use and reduces the need for inventory of disparate parts and cost of manufacture. Moreover, it effectively and completely seals the port of the component being tested against leakage without a reduction in the longevity of the plug, and it may be used with equal facility for the testing of components which present flat as well as contoured ends.

It also will be understood that the embodiment of the present invention which has been described is merely illustrative of an application of the principles of the present invention. Numerous modifications may be made by those skilled in the art without departing from the spirit and scope of the present invention.

What is claimed is:

1. A fluid operated port plug for sealingly closing a port against leakage comprising:
    a cylinder casing having opposite ends and a chamber therein between said ends;
    a piston in said chamber;
    a piston rod on said piston and having an end extending through at least one end of said cylinder casing;
    a resilient member on said end of said piston rod, said resilient member having a first resilient portion and a second resilient portion between said cylinder casing and said first resilient portion, and adjacent to said first portion, said second resilient portion extending outwardly from said first resilient portion; and
    means for introducing a pressurized fluid to said chamber to move said piston and piston rod and compress said resilient member between said end of said piston rod and said one end of said cylinder casing, and to cause said first resilient portion to expand in the port and said second resilient portion to move into the port, whereby the port is sealed against leakage.

2. The plug of claim 1, wherein said second resilient portion extends from said first resilient portion toward said one end of said cylinder casing.

3. The plug of claim 2, wherein said second resilient portion is substantially conical and extends outwardly from said first resilient portion.

4. The plug of claim 3, wherein said first and second resilient portions are formed in integral one-piece relationship to each other.

5. The plug of claim 1, wherein said first and second resilient portions are formed in integral one-piece relationship to each other.

6. The plug of claim 1, wherein said second resilient portion extends outwardly at an angle to said first resilient portion.

7. The plug of claim 1, wherein said second resilient portion is substantially conical.

8. The plug of claim 7, wherein said first resilient portion is substantially cylindrical and said first and second resilient portions are formed in integral one-piece relationship to each other.

9. The plug of claim 1, wherein said piston rod has a passage therein which opens to said end of said piston rod to discharge fluid therefrom.

10. The plug of claim 9, wherein said resilient member substantially surrounds said end of said piston rod.

11. The plug of claim 9, including at least two ports therein, one port communicating with said chamber to introduce and exhaust fluid therefrom to move said piston and piston rod, and the second port communicating with said passage in said piston rod to introduce fluid thereto.

12. The plug of claim 11, wherein said piston rod has an end which extends through the other end of said chamber, and said second port is in the last mentioned end of said piston rod.

13. The plug of claim 1, wherein said resilient member substantially surrounds said end of said piston rod.

14. The plug of claim 1, wherein said cylinder casing has valve means therein for introducing fluid to and exhausting fluid from said chamber to move said piston and piston rod.

15. The plug of claim 14, wherein said valve means comprises a passage in said cylinder casing and a movable spool valve therein.

16. The plug of claim 15, wherein the last mentioned passage and spool valve extend at an angle to said piston rod.

17. The plug of claim 15, wherein said spool valve is capable of manipulation manually by the finger of an operator.

18. A method of sealing a port comprising the steps of:
    inserting a first resilient portion of an elongate resilient member into the port;
    compressing said elongate resilient member box fluid pressure to cause said first resilient portion to radially expand in said port; and
    moving a second resilient portion of the elongate resilient member into an end of said port as a result of the compression of the elongate resilient member to seal said port against leakage.

19. The method of claim 18, wherein the radial expansion of said first resilient portion also seals said port against leakage.

20. The method of claim 18, wherein said first and second resilient portions are formed in integral one-piece relationship with each other.

21. The method of claim 18, wherein said second resilient portion extends outwardly at an angle from and adjacent to said first resilient portion and the end adjacent said first resilient portion moves into the end of said port to seal the port against leakage.

22. The method of claim 18, including introducing a pressurized fluid through said elongate resilient member and then through said port following compression of said elongate resilient member and sealing of said port.

23. The method of claim 18, wherein said elongate resilient member is compressed by a fluid actuated piston.

24. A fluid operated port plug for sealingly closing a port against leakage, comprising:
    a cylinder casing having opposite ends and a chamber therein between said ends;
    a piston in said chamber;
    a piston rod on said piston and having an end extending through at least one end of said cylinder casing;
    a resilient member on said end of said piston rod having a given length; and
    means for moving said piston and piston rod and shorten the length of said resilient member to cause said resilient member to both expand in the port and to move into an end of the port, whereby the port is sealed against leakage.

25. The plug of claim 24, wherein said resilient member includes a first resilient portion and a second resilient portion between said cylinder casing and said first resilient portion, and adjacent to said first resilient portion, said second resilient portion extending outwardly from said first resilient portion.

26. The plug of claim 25, wherein second resilient portion extends outwardly at an angle to said first resilient portion.

27. The plug of claim 26, wherein second resilient portion is substantially conical.

28. The plug of claim 27, wherein said first resilient portion is substantially cylindrical and said first and second resilient portions are formed in integral one-piece relationship to each other.

29. The plug of claim 25, wherein said first and second resilient portions are formed in integral one-piece relationship to each other.

30. The plug of claim 24, wherein said resilient member substantially surrounds said end of said piston rod.

31. The plug of claim 24, wherein said cylinder casing has valve means therein for introducing fluid to and exhausting fluid from said chamber to move said piston and piston rod.

32. The plug of claim 31, wherein said valve means comprises a passage in said cylinder casing and a movable spool valve therein.

33. The plug of claim 32, wherein said passage and spool valve extend at an angle to said piston rod.

34. The plug of claim 32, wherein said spool valve is capable of manipulation manually by the finger of an operator.

35. A method of sealing a port comprising the steps of:
 inserting a resilient member into the port; and
 compressing said resilient member by fluid pressure to cause said resilient member to both radially expand in the port and move into an end of the port by shortening the length of said resilient member to thereby seal the port against leakage.

36. The method of claim 35, wherein said resilient member includes first and second resilient portions, said first resilient portion radially expands in the port to seal the port against leakage, and said second resilient portion moves into the end of the port to also seal the port against leakage.

37. The method of claim 36, wherein said first and second resilient portions are formed in integral one-piece relationship with each other and move simultaneously with each other.

38. The method of claim 36, wherein said second resilient portion extends outwardly at an angle from and adjacent to said first resilient portion and the end adjacent said first resilient portion moves into the end of said port to seal the port against leakage.

39. The method of claim 35, wherein said resilient member is compressed by a fluid actuated piston.

40. A method of sealing a port comprising the steps of:
 inserting a first resilient portion of an elongate resilient member into the port;
 compressing said elongate resilient member to cause said first resilient portion to radially expand in said port;
 moving a second resilient portion of the elongate resilient member into an end of said port as a result of the compression of the elongate resilient member to seal said port against leakage; and
 introducing a pressurized fluid through said elongate resilient member and then through said port following compression of said elongate resilient member and sealing of said port.

* * * * *

UNITED STATES PATENT AND TRADEMARK OFFICE
CERTIFICATE OF CORRECTION

PATENT NO. : 5,337,598
DATED : Aug. 16, 1994
INVENTOR(S) : Rab

It is certified that error appears in the above-indentified patent and that said Letters Patent is hereby corrected as shown below:

Col. 8, line 26, delete "box" and insert --by--.

Signed and Sealed this

Sixteenth Day of April, 1996

BRUCE LEHMAN

Attest:

Attesting Officer

Commissioner of Patents and Trademarks